Dec. 15, 1953 R. J. ANDERSON 2,662,651
TILTABLE DUMPING DEVICE FOR MOLD CONVEYERS
Filed Nov. 7, 1951 3 Sheets-Sheet 1

INVENTOR
RUSSELL J. ANDERSON
BY H.O.Vogel
ATT'Y

Dec. 15, 1953     R. J. ANDERSON     2,662,651
TILTABLE DUMPING DEVICE FOR MOLD CONVEYERS
Filed Nov. 7, 1951     3 Sheets-Sheet 2
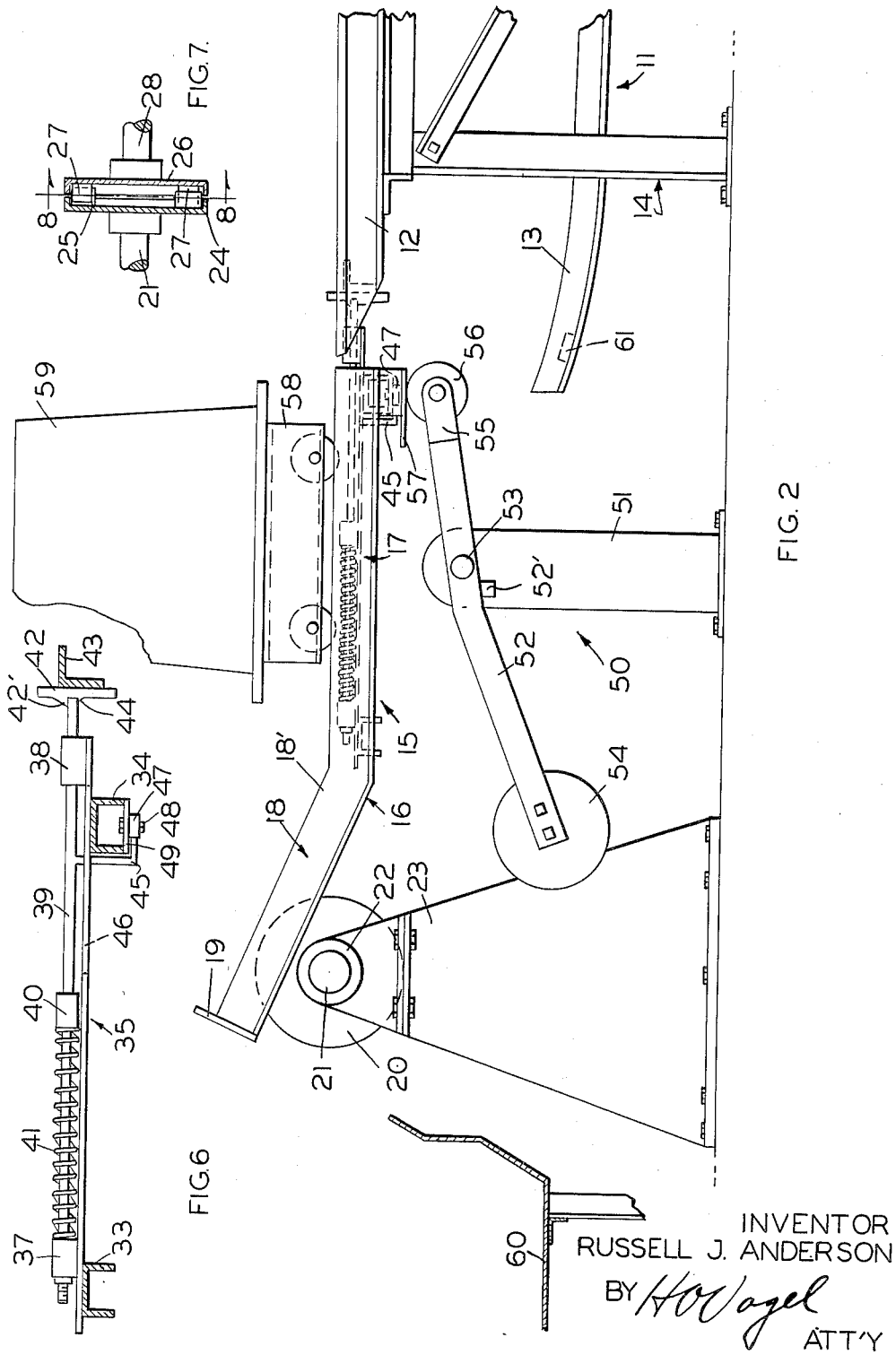
INVENTOR
RUSSELL J. ANDERSON
BY H O Vogel
ATT'Y

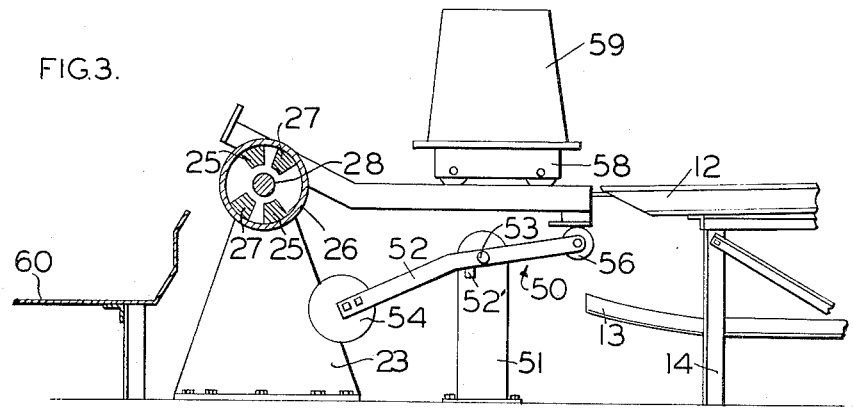
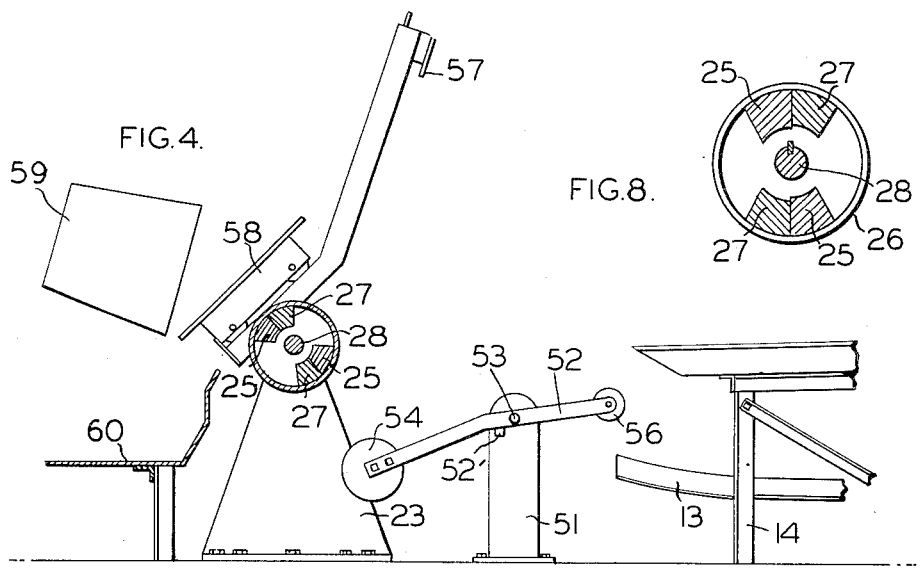
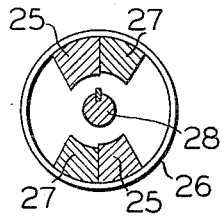
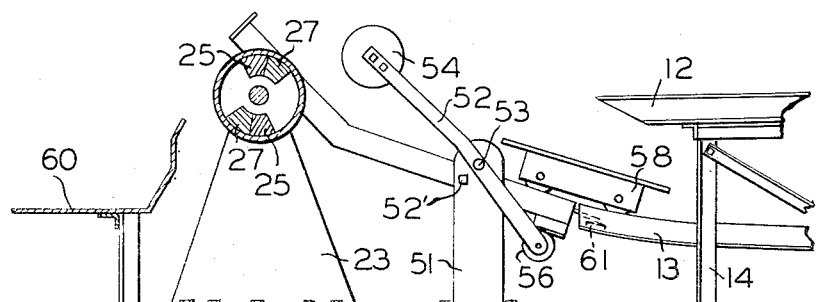

Patented Dec. 15, 1953

2,662,651

UNITED STATES PATENT OFFICE 2,662,651

TILTABLE DUMPING DEVICE FOR MOLD CONVEYERS

Russell J. Anderson, Racine, Wis., assignor to Belle City Malleable Iron Company, a corporation of Wisconsin Application November 7, 1951, Serial No. 255,226

13 Claims. (Cl. 214—46.22)

This invention relates to conveyers for transporting mold carriers. More particularly this invention relates to an improvement in a dumping cradle or tiltable track section for receiving mold carriers, for dumping the molds from the carriers and for discharging the carriers to a return track.

In applicant's Patent 2,535,715, patented December 26, 1950, a dumping mechanism for mold conveyers is disclosed. This patent discloses an upper track which delivers a wheeled carrier to a dumping cradle whereupon the mold on the carrier is dumped and the empty carrier is then discharged to a lower return track. The cradle includes a tilting track section which is tilted to a dumping position and alternately into aligned position with respect to the upper and lower tracks. The tilting action of the cradle in this patent is obtained by the weight of the loaded carrier and the employment of a counterweight which is connected to the cradle. It is a prime object of this invention to provide an improved tiltable dumping device for mold conveyers wherein the tilting action is accomplished by the employment of a power unit in combination with a counterweight structure.

Another object is to provide a counterweight structure for actuating a tiltable dumping cradle, the structure being disposed adjacent the dumping cradle and being engageable with the cradle only during a certain phase in its operation.

Still another object is to provide an improved power connection between a dumping cradle and a power unit, the said connection including a pair of clutch elements engageable for effectuating dumping of the cradle during actuation of the power unit.

A still further object is to provide a power actuated dumping cradle, said dumping cradle being tiltable about a horizontal axis by means of a power unit to a dumping position, the cradle being tiltable from the dumping position by gravity, and including a shock reducing mechanism positioned adjacent the cradle, said mechanism being adapted to retard the gravitational action of the tilting cradle.

A further object is to provide a power actuated dumping track which is tilted by power to a dumping position and which gravitates from the dumping position to a position in alignment with a return track, and a counterweight structure positioned adjacent the dumping track for engaging the track and tilting said track from said return track.

A still further object is to provide an improved dumping cradle for a mold conveyer consisting of upper and lower tracks, the cradle including a tilting track having an open track section extending in a substantially horizontal direction at the same height as the upper track of the conveyer, the track including a closed track section inclined in an upwardly extending direction with respect to the open track section.

These and further objects will become more readily apparent from a reading of the specification when examined in connection with the accompanying sheets of drawings.

In the drawings:

Figure 2 is a side elevational view of a conveyer including a dumping cradle, the view being taken substantially along line 2—2 of Figure 1.

Figure 3 is a side elevational view of a tilting track or dumping cradle the view being similar to Figure 2 but showing a clutch mechanism in schematic form to better illustrate the invention.

Figure 4 is an elevational view similar to Figure 3 showing a dumping cradle in tilted position for dumping.

Figure 5 is an elevational view similar to Figure 4, showing a dumping cradle in a carrier return position.

Figure 6 is a detail view in elevation of a locking latch for a dumping cradle, the view being taken generally along the line 6—6 of Figure 1.

Figure 7 is a detail view of a clutch mechanism taken substantially along the line 7—7 of Figure 1.

Figure 8 is a sectional view of a clutch mechanism taken substantially along line 8—8 of Figure 7.

Figure 1:
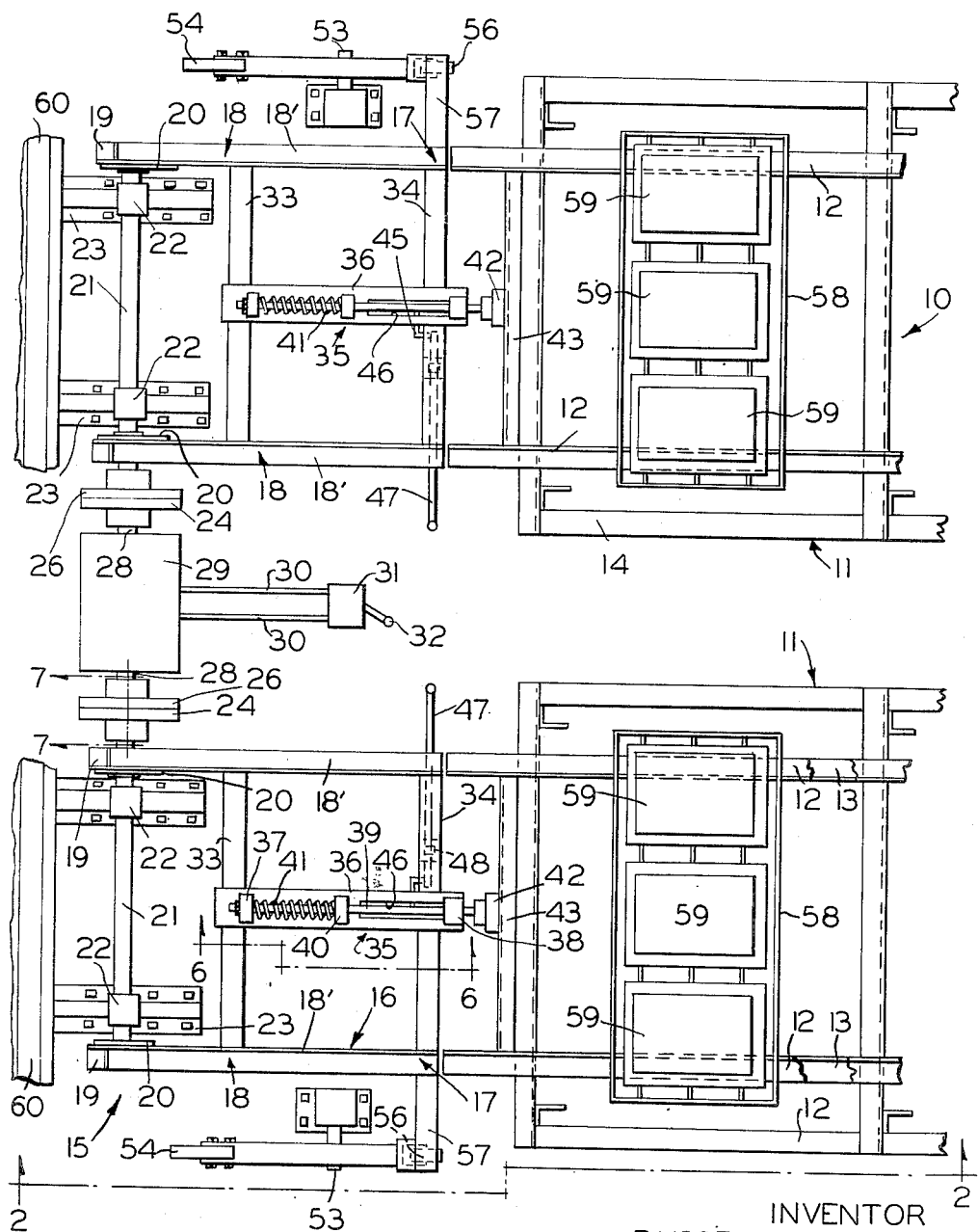
Figure 1 is a plan view of a mold dumping arrangement for foundries, the arrangement including a pair of conveyers positioned in side-by-side relation, each conveyer including an improved dumping cradle.

Referring particularly now to Figure 1 a foundry mold dumping arrangement is generally designated by the reference character 10, the arrangement including a pair of conveyers 11 supported in side by side relation. Since each of the conveyers 11 contains the same arrangement of parts the same reference characters will be applied where the parts are identical. Each conveyer 11 includes an upper feed track 12 and a lower return track 13 which is disposed immediately below the feed track 12. The tracks 12 and 13 are suitably supported on a supporting structure 14 for maintaining the tracks 12 and 13 vertically spaced with respect to each other and in a raised position supported on the ground or floor of the foundry.

The track 12 slopes or is inclined toward, and the return track 13 is inclined from a dumping cradle or tilting track section generally designated by the reference character 15. The cradle 15 is provided with a track 16 consisting of track sections 17 and 18 suitably formed by laterally spaced track rails 18' of a conventional type. The end of the track section 17 is open and is adapted to be placed in cooperative alignment with either the upper or lower tracks 12 and 13 respectively. The forward ends of the track section 18 are inclined in an upward direction with respect to the track section 17; the forward end of the track section 18 being blocked by means of an upwardly extending stop member 19 which is adapted to block movement on the track rails 18'. The forward ends of the track rails 18' are securely connected to a pair of transversely spaced rotating plates 20 which in turn are securely connected to a shaft 21 extending between the rails 18'. The shaft 21 is suitably supported for rotation about a horizontal axis and bearing members 22 mounted on spaced supports 23.

The shaft 21 is rigidly connected to a clutch plate 24, as best shown in Figure 7 which has integrally connected thereto a pair of oppositely disposed clutch jaws 25, also indicated in the schematic showing of the clutches in Figures 3, 4 and 5. The clutch plate 24 is in engagement with a clutch plate 26 having oppositely disposed clutch jaws 27. The clutch plate 26 is rotated by means of a shaft 28 which is in operative engagement with a hydraulic power unit 29, schematically shown. It is not felt necessary to discuss the details of the power unit 29 since it can be of a conventional type adapted to apply rotative power to the shaft 28. The power unit 29 includes conduits 30 which lead to a control valve 31 suitably controlled by a manual member 32.

The cradle is provided with a pair of transversely extending supports 33 and 34 on which a latch mechanism 35 is mounted. The latch mechanism 35 includes a longitudinally extending bar 36 supported on the supports 33 and 34. A pair of bearings 37 and 38 are mounted on the bar 36 and slidably support a rod 39. The rod includes a collar 40 rigidly connected to the rod and a spring 41 is positioned between the bearing 37 and the collar 40 on the rod 39 for normally urging said rod in a rearward direction with respect to the cradle 15, and into locking engagement with a latch 42 connected to a transversely extending angle member 43 positioned on the end of the upper track 12. The latch 42 has an upper catch portion 42' projecting outwardly beyond a lower catch portion 44 which permits swinging movement of the rod 39 in a downward direction without engagement with the latch 42. The rod 39 is further provided with an arm 45 which is slidable with the rod 39 in a slot 46 formed in the bar 36. The arm 45 is engaged by a lever 47 which is pivotally mounted as indicated at 48 on a plate 49 connected to the support 34.

Positioned to one side of the dumping cradle 15 is a shock reducing and counterweight mechanism 50. The mechanism 50 includes a support 51 on which a lever arm 52 is positioned for rocking movement about a horizontal axis on a pivot 53. A counterweight 54 is rigidly connected to one end of the arm 52. A stop element 52' on the support 51 limits the downward movement of the counterweight 54. A yoke member 55 is provided at the other end of the arm 52, the yoke having journalled thereon a rotatable bearing element or roller 56. The roller 56 is adapted to be engaged by a striking plate 57 connected to the support 34 and projecting laterally outwardly from the cradle 15.

A wheeled pallet or mold carrier 58 is positioned to travel on the tracks of the conveyer 11 and the dump cradle 15. The carrier 15 is shown transporting a plurality of molds 59 which are to be dumped into a conveyer 60 positioned at the forward end of the dumping cradle 15.

The operation

A carrier 58 containing a mold 59 travels from the upper track 12 of one of the conveyers 11 to the dumping cradle 15 as indicated in Figure 3. The carrier 58 travels on track section 17 to a point immediately adjacent the track section 18 which slopes in an upward direction. An operator who is stationed between the conveyers 11 then actuates the lever 47 which pivots causing engagement with the arm 45 to move the rod 39 away from the latch 42 so that the cradle 15 may be pivoted. The manual member 32 is moved in a direction whereupon the valve 31 actuates the hydraulic power unit 29. (Any suitable power unit such as an electric motor can of course be utilized without detracting from the effectiveness of the invention. The power unit 29 causes rotation of the shaft 28 and clutch plate 26 in a counterclockwise direction. The jaws 27 engage the jaws 25 and rotate the clutch plate 24. Since the clutch plate 24 is rigidly secured to the shaft 21 the shaft 21 is rotated, in turn imparting the tilting movement to the cradle 15 to its dumping position.

As the track sections 17 and 18 are tilted upwardly, the carrier 58 rolls on the track section 18 until it engages the stop member 19 whereupon the mold 59 is dumped from the carrier to the conveyer 60.

The power unit 29 is now reversed so that the clutch plate 26 assumes the position shown in Figure 5. The cradle 15 now gravitates to the position shown in Figure 5 wherein the track section 17 is in alignment with the lower return track 13. During this swinging movement of the cradle 15 the rod 39 will not engage the latch 42 since the upper catch portion 42' is of larger projection than the latch portion 44 and permits the rod 39 to swing downwardly beyond the latch portion 44.

As the cradle 15 swings to its downward position the striking plate 57 engages the roller 56 causing swinging movement of the lever 52 on the support 51 whereupon the counterweight 54 is moved upwardly. The counterweight structure 50 serves to absorb or reduce the shock of the gravitational movement of the cradle so that the swinging velocity is greatly reduced and the track section 17 moves into alignment with the lower track section 13 and the rod 39 comes to rest upon a stop 61 on the lower track section 13 in a gentle manner.

The carrier 58 is now discharged from the cradle 15 and the decreased loading on the cradle permits the counterweight 54 to gravitate downwardly whereupon the lever 52 pushes the cradle 15 into its original position shown in Figure 3, in which the cradle is held by the latch mechanism 35. The cycle of operation can now be repeated.

Thus it is clearly apparent that applicant has provided an improved dumping cradle construction which utilizes a combination of power and counterweight structure for effecting tilting movement of the cradle to a plurality of positions. The counterweight structure also acts as a shock reducing medium so that the gravitational movement of the cradle is controlled and the carrier can be discharged effectively without the possibility of derailment or excessive wear and shock on the conveyer system.

Thus the objects of the invention have been fully achieved and it must be understood that changes and modifications may be made without departing from the spirit of the invention as disclosed or from the scope thereof as defined in the following claims.

What I claim is:

1. In a conveyer for transporting mold carriers including an upper track inclined in one direction, and a lower return track inclined in an opposite direction; a tilting dumping cradle positioned adjacent the ends of the upper and lower tracks, a track on said cradle movable alternately during tilting of the cradle into cooperative alignment with the upper and lower tracks thereby alternately providing a continuation of either, means for tilting said cradle comprising a shaft connected to said cradle, supporting means for supporting said shaft for rotation about a horizontal axis, a power unit positioned adjacent said cradle, a first clutch means on said shaft, a second clutch means on said power unit, said clutch means being engageable during operation of the power unit for rotating the track upwardly to a dumping position, said track being swingable from the dumping position by gravity into alignment with the lower track, a shock reducing mechanism positioned adjacent said cradle, said shock reducing mechanism including a support, an arm connected to said support intermediate its ends for pivotal movement about a horizontal axis, a counterweight on one end of said arm, a roller on the other end of said arm, and a bracket projecting laterally outwardly from said cradle, said bracket being engageable with the roller during swinging movement of the track to its cooperating position with the lower track whereby a carrier on said cradle may be discharged and whereby the counterweight is moved in an upward direction whereupon said counterweight pivots said arm to return said track into registering cooperation with the upper track.

2. In a conveyer for transporting mold carriers including an upper track inclined in one direction, and a lower return track inclined in an opposite direction; a tilting dumping cradle positioned adjacent the ends of the upper and lower tracks, a track on said cradle movable alternately during tilting of the cradle into cooperative alignment with the upper and lower tracks thereby alternately providing a continuation of either, means for tilting said cradle comprising a power unit positioned adjacent said cradle, a first clutch means on said cradle, a second clutch means on said power unit, said clutch means being engageable during operation of the power unit for rotating the cradle and track upwardly to a dumping position, said track being swingable from the dumping position by gravity into alignment with the lower track, a shock reducing mechanism positioned adjacent said cradle, said shock reducing mechanism including a support, an arm connected to said support intermediate its ends for pivotal movement about a horizontal axis, a counterweight on one end of said arm, a roller on the other end of said arm, and a bracket projecting laterally outwardly from said cradle, said bracket being engageable with the roller during swinging movement of the track to its cooperating position with the lower track whereby a carrier on said cradle may be discharged and whereby the counterweight is moved in an upward direction whereupon said counterweight pivots said arm to return said track into registering cooperation with the upper track.

3. In a conveyer for transporting mold carriers including an upper track inclined in one direction and a lower return track inclined in an opposite direction, a tilting track section positioned adjacent the ends of the upper and lower tracks for pivotal movement about a horizontal axis, the track being normally in cooperative alignment with the upper track during a first position and being tiltable upwardly to a dumping position whereupon a mold carried on a carrier adapted to be positioned on said track section is dumped from the carrier, said track section being swingable downwardly to a third position in cooperative alignment with the lower track section, means for tilting said track section to the dumping position including a power unit positioned adjacent said track section, a clutch element on said track section, a clutch element in operative connection with said power unit, said clutch elements being movable into engagement with each other for tilting said track section, said track section being movable by gravity to move to said third position, an actuating and shock reducing mechanism positioned adjacent said track section, said mechanism including a support, an arm rockably supported intermediate its ends on said support, a roller on one end of said arm, a counterweight on the other end of said arm, and means on said track section engageable with said roller during movement of the track section to its third position to move said counterweight to a raised position whereupon a carrier on the track section is adapted to be discharged, said counterweight being movable for rocking said arm to return said track section to the first position.

4. In a conveyer for transporting mold carriers including an upper track inclined in one direction and a lower return track inclined in an opposite direction, a tilting track section positioned adjacent the ends of the upper and lower tracks for pivotal movement about a horizontal axis, the track being normally in cooperative alignment with the upper track during a first position and being tiltable upwardly to a dumping position whereupon a mold carried on a carrier adapted to be positioned on said track section is dumped from the carrier, said track section being swingable downwardly to a third position in cooperative alignment with the lower track section, means for tilting said track section to the dumping position including a power unit connected to said track section, said track section being movable by gravity to move to said third position, an actuating and shock reducing mechanism positioned adjacent said track section, said mechanism including a support, an arm rockably supported intermediate its ends on said support, bearing means on one end of said arm, a counterweight on the other end of said arm, and means on said track section engageable with said bearing means during movement of the track section to its third position to move said counterweight to a raised position whereupon a carrier on the track section is adapted to be discharged, said counterweight being movable for rocking said arm to return said track section to the first position.

5. In a conveyer for transporting mold carriers including an upper track inclined in one direction and a lower return track inclined in an opposite direction, a tilting track section positioned adjacent the ends of the upper and lower tracks for pivotal movement, the track being normally in cooperative alignment with the upper track during a first position and being tiltable upwardly to a dumping position whereupon a mold carried on a carrier adapted to be positioned on said track section is dumped from the carrier, said track section being swingable downwardly to a third position in cooperative alignment with the lower track section, means for tilting said track section to the dumping position including a power unit connected to said track section, said track section being movable by gravity to move to said third position, an actuating and shock reducing mechanism associated with said track section, said mechanism including a support, an arm rockably mounted on said support, bearing means on said arm, a counterweight on the other end of said arm, and means on said track section engageable with said bearing means during movement of the track section to its third position to move said counterweight to a raised position whereupon a carrier on the track section is adapted to be discharged, said counterweight being movable for rocking said arm to return said track section to the first position.

6. In a conveyer for transporting mold carriers including an upper track inclined in one direction and a lower return track inclined in an opposite direction, a tilting track section positioned adjacent the ends of the upper and lower tracks for pivotal movement about a horizontal axis, the track being normally in cooperative alignment with the upper track during a first position and being tiltable upwardly to a dumping position whereupon a mold carried on a carrier adapted to be positioned on said track section is dumped from the carrier, said track section being swingable downwardly to a third position in cooperative alignment with the lower track section, power means for tilting said track section to the dumping position, said track section being movable by gravity to the third position, an actuating and shock reducing mechanism positioned adjacent said track section, said mechanism including a rockable member pivotally supported movement about a horizontal axis, a counterweight on one end of said rockable member, a bearing member on the other end of said rockable member, means on said track section adapted to engage said bearing member for pivoting said rockable member whereupon said counterweight is raised during movement of the track to the third position and a carrier adapted to be positioned on said track section is discharged to the return track, said counterweight being adapted to move said rockable member for moving said track section to its first position.

7. In a conveyer for transporting mold carriers including an upper track inclined in one direction and a lower return track inclined in an opposite direction, a tilting track section positioned adjacent the ends of the upper and lower tracks for pivotal movement about a horizontal axis, the track being normally in cooperative alignment with the upper track during a first position and being tiltable upwardly to a dumping position whereupon a mold carried on a carrier adapted to be positioned on said track section is dumped from the carrier, said track section being swingable downwardly to a third position in cooperative alignment with the lower track section, power means for tilting said track section to the dumping position, said track section being movable by gravity to the third position, shock reducing mechanism positioned adjacent said track section, said mechanism including a member rockably supported, a counterweight on one end of said rockable member, a bearing member on the other end of said rockable member, bracket means on said track section adapted to engage said bearing member for pivoting said rockable member whereupon said counterweight is moved during movement of the track to the third position and a carrier adapted to be positioned on said track section is discharged to the return track, said counterweight being adapted to return to its original position for moving said track section to its first position.

8. In a conveyer for transporting mold carriers including an upper track inclined in one direction and a lower return track inclined in an opposite direction, a tilting track section positioned adjacent the ends of the upper and lower tracks for pivotal movement about a horizontal axis, the track being normally in cooperative alignment with the upper track during a first position and being tiltable upwardly to a dumping position whereupon a mold carried on a carrier adapted to be positioned on said track section is dumped from the carrier, said track section being swingable downwardly to a third position in cooperative alignment with the lower track section, power means for moving said track section to said dumping position, means disengageable between said power means and said track section whereby said track section is swung by gravity to said third position, shock reducing mechanism operatively connected to said track section including an arm rockably supported adjacent said track section, said arm including a counterweight, means on said track section for engaging said arm to raise said counterweight during the movement of said track section to its third position, said counterweight being movable to return said track section to the first position.

9. The combination with a conveyer comprising an upper track inclined in one direction, a lower track inclined in an opposite direction, and a mold carrier movable on said tracks; of a dumping track having an open end and a closed end, said track being positioned adjacent the ends of the upper and lower tracks; means for supporting said dumping track for pivotal movement about a horizontal axis, whereby the open end of said dumping track may be moved into cooperative alignment with the upper and lower tracks to provide a continuation of either; a power unit connected to said dumping track for raising the open end of said track upwardly whereby a mold carrier on said dumping track is moved to the closed end and a mold on the carrier may be dumped; means for releasing said dumping track from the raised position whereupon said dumping track gravitates downwardly and the open end of said dumping track is moved into alignment with the lower track and the carrier is discharged thereto; and a counterweight structure positioned adjacent said dumping track, said counterweight structure being movable to engage said dumping track for raising the open end of said dumping track into cooperative alignment with the upper track.

10. The combination with a conveyer comprising an upper track inclined in one direction, a lower track inclined in an opposite direction, and a mold carrier movable on said tracks; of a dumping track having an open end and a closed end, said track being positioned adjacent the ends of the upper and lower tracks, means for supporting said dumping track for pivotal movement about a horizontal axis whereby the open end of said dumping track may be moved into cooperative alignment with the upper and lower tracks to provide a continuation of either, a power unit connected to said dumping track for raising the open end of said track upwardly whereby a mold carrier on said dumping track is moved to the closed end and a mold on the carrier may be dumped, means releasably connecting said dumping track with said power unit whereupon said dumping track gravitates downwardly and the open end of said dumping track is moved into alignment with the lower track and the carrier is discharged thereto, and a counterweight structure movable to engage said dumping track for raising the open end of said dumping track into cooperative alignment with the upper track.

11. For a mold conveyer having an upper track inclined in one direction, a lower track inclined in an opposite direction and a mold carrier movable on said tracks; a dumping track comprising a frame tiltable about a horizontal axis, a first track section on said frame for tilting movement therewith whereby said first track may be moved alternately into alignment with either the upper or the lower track to provide a continuation of either, a second track on said frame, said second track being a continuation of the first track and extending upwardly with respect thereto, a carrier stop on one end of said second track, a power unit connected to said frame for tilting the first track and a mold carried thereon upwardly whereby the carrier moves onto the second track and engages the carrier stop whereby a mold on said carrier may be dumped, and means adapted to release said frame from operative engagement with said power unit whereby said first track with said frame is moved downwardly under the influence of gravity and the first track is moved into alignment with the lower track whereupon the carrier is discharged.

12. For a mold conveyer having an upper track inclined in one direction, a lower track inclined in an opposite direction and a mold carrier movable on said tracks; a dumping track comprising a frame tiltable about a horizontal axis, a first track section on said frame for tilting movement therewith whereby said first track may be moved alternately into alignment with either the upper or the lower track to provide a continuation of either, a second track on said frame, said second track being a continuation of the first track and extending upwardly with respect thereto, a carrier stop on one end of said second track, a power unit connected to said frame for tilting the first track and a mold carried thereon upwardly whereby the carrier moves onto the second track and engages the carrier stop whereby a mold on said carrier may be dumped, means adapted to release said frame from operative engagement with said power unit whereby said first track with said frame is moved downwardly under the influence of gravity and the first track is moved into alignment with the lower track whereupon the carrier is discharged, and a counterweight structure engageable by said moving first track to move said counterweight upwardly thereby limiting the gravitational movement of the first track, said counterweight being adapted to move said frame and said first track to its cooperating aligned position with the upper track.

13. For a mold conveyer having an upper track inclined in one direction, a lower track inclined in an opposite direction and a mold carrier movable on said tracks; a dumping track comprising a frame tiltable about a horizontal axis, a first track section on said frame for tilting movement therewith whereby said first track may be moved alternately into alignment with either the upper or the lower track to provide a continuation of either, a second track on said frame, said second track being a continuation of the first track and extending upwardly with respect thereto, a carrier stop on one end of said second track, a power unit connected to said frame for tilting the first track and a mold carried thereon upwardly whereby the carrier moves onto the second track and engages the carrier stop whereby a mold on said carrier may be dumped, and means adapted to release said frame from operative engagement with said power unit whereby said first track with said frame is moved downwardly under the influence of gravity and the first track is moved into alignment with the lower track whereupon the carrier is discharged and a stationary counterweight structure positioned adjacent the frame, said structure including a counterweight, means on said frame engaging said counterweight structure to raise the counterweight during movement of the first track section whereby the gravitational speed of movement of said first track section is limited, said counterweight being movable for returning said first track into alignment with the upper track.

RUSSELL J. ANDERSON.

References Cited in the file of this patent

UNITED STATES PATENTS

| Number | Name | Date |
|---|---|---|
| 1,065,325 | Greene | June 17, 1913 |
| 2,466,650 | Walker et al. | Apr. 5, 1949 |